United States Patent
Boll

(10) Patent No.: US 6,237,314 B1
(45) Date of Patent: May 29, 2001

(54) GUIDE MEMBER FOR HARVESTING STALKED CROPS

(75) Inventor: Ulrich Boll, Saulgau (DE)

(73) Assignee: Claas Saulgau GmbH, Saulgau (DE)

( * ) Notice: Subject to any disclaimer, the term of this patent is extended or adjusted under 35 U.S.C. 154(b) by 0 days.

(21) Appl. No.: 09/363,431

(22) Filed: Jul. 28, 1999

(30) Foreign Application Priority Data

Jul. 29, 1998 (DE) .............................................. 198 34 248

(51) Int. Cl.$^7$ .................................................. A01D 34/00
(52) U.S. Cl. ................................................. 56/500; 56/119
(58) Field of Search ............................ 56/500, 502, 118, 56/503, 75, 33, 78, 36, 88, 330, 82, 52, 93, 53, 59, 106, 62, 69, 66, 94, 98, 103, 111, 119

(56) References Cited

U.S. PATENT DOCUMENTS

| | | | |
|---|---|---|---|
| 4,084,396 | * 4/1978 | Fritz et al. | 56/98 |
| 4,227,366 | * 10/1980 | Pucher | 56/14.2 |
| 4,539,799 | * 9/1985 | Kalverkamp | 56/60 |
| 4,598,535 | * 7/1986 | Sousek | 56/98 |
| 5,161,355 | * 11/1992 | Diederich, Jr. | 56/51 |
| 5,878,561 | * 10/1996 | Gunn | 56/98 |

FOREIGN PATENT DOCUMENTS

3838979 A1   5/1990 (DE) .............................. A01D/46/00
43 44 669    4/1995 (DE) .............................. A01D/45/02

OTHER PUBLICATIONS

CLAAS KGaA Maispflücker brochure, No. 190.146.1., including English version, no date.

* cited by examiner

Primary Examiner—Robert E. Pezzuto
Assistant Examiner—Árpád Kovács
(74) Attorney, Agent, or Firm—Husch & Eppenberger, LLC; Robert E. Muir; Kevin M. Kercher

(57) ABSTRACT

The invention concerns an apparatus for harvesting stalk crops, with at least one conveying device revolving around deflecting elements for conveying the crop along at least one snapping roller constructed in one or more parts and associated with a snapping gap which is variably adjustable with snapping gap plates arranged in guides, wherein the conveying element of the conveying device provides traction with a tensioner running in a guide portion, preferably a chain, which is at least partly surrounded by guide elements, at least one of the displaceable snapping gap plates, or at least one tensioner and are made of elastic vibration-damping material. As a result the number of parts to be assembled or to be exchanged in case of damage is considerably reduced, and by the use of an elastic vibration-damping material, besides a reduction of wear-increasing vibrations, a reduction in the whole weight of the front attachment is achieved.

13 Claims, 4 Drawing Sheets

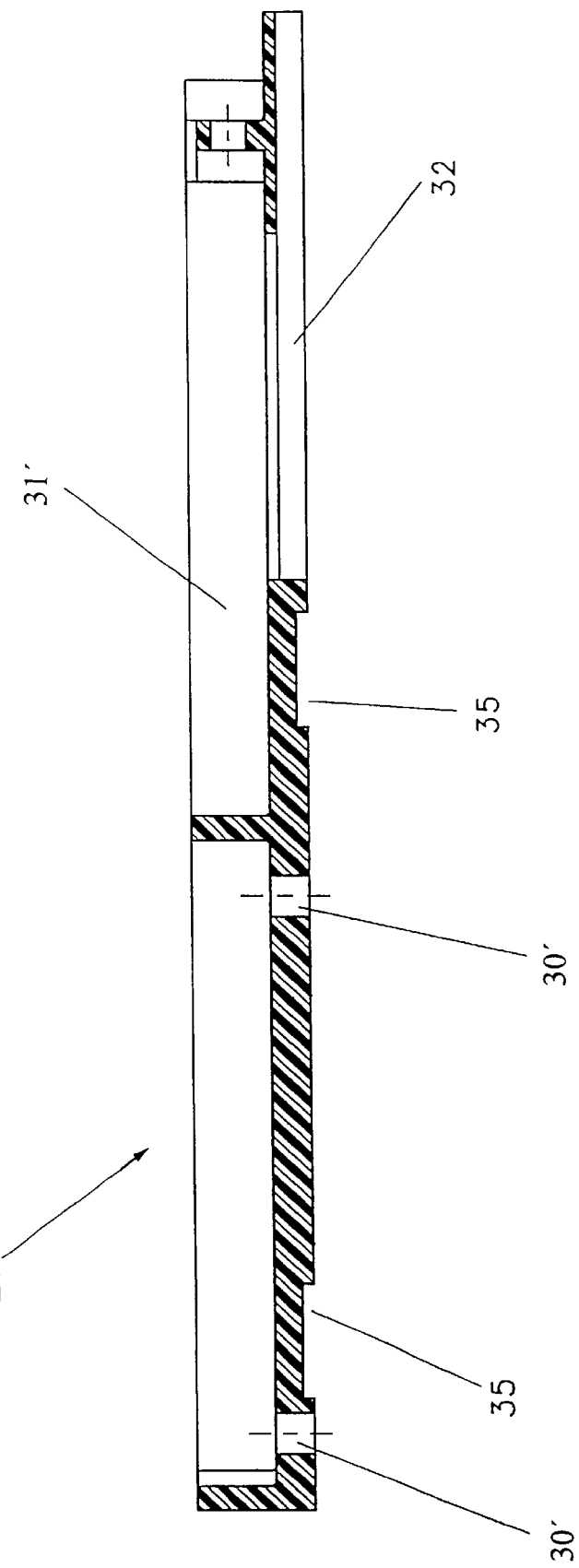
Fig 4    C - C

GUIDE MEMBER FOR HARVESTING STALKED CROPS

BACKGROUND OF THE INVENTION

The invention relates generally to apparatus for harvesting stalk crops such as corn or the like and, more particularly, to an improved harvester head.

German Patent Publication 3838979 A1 and German Patent 4344669 disclose apparatuses for harvesting stalk crops with snapping units including at least one feed and snapping roller below a snapping gap. The snapping gap has product-transporting conveying elements on conveyor chains. For lateral yielding of the conveying span of the chains to be avoided, the chains have guide elements which at least partially contact the revolving chains and are arranged releasably on a common main body. Such an arrangement is shown in corn picker (Maispflüucker) brochure of CLAAS KGaA, no. 190.146.1. To compensate for gradual stretching of the chain, the conveyor chains are provided with tensioners which in general allow tensioning of the conveyor chains against the action of a spring. In order for reliable stalk feeding to be continued at all times, the snapping gaps of each snapping unit can be adjusted within a given range to the stalk diameter of the crop. Generally one of the snapping gap-forming snapping plates is stationary, and the other is displaceable in its position transversely to the direction of travel by hydraulic or mechanical displacement mechanisms. The guide elements of the chains, the chain tensioners, and the parts which hold the displacement mechanism of the snapping plates are essentially constructed as bent sheet metal and welded parts which are releasably attached to a common main body. This construction causes high assembly costs. Substantial drawbacks of snapping units designed in this way include poor accessibility of the fasteners during assembly or repair, a large number of necessary component parts, and the resulting high weight of the front attachment.

SUMMARY OF THE INVENTION

It is an object of the present invention to overcome one or more of the problems or deficiencies described above.

Another object is to provide an improved harvesting head in which the guide elements of the chains, the guide system of the chain tensioners, and the guide system which receives the displacement mechanism of the snapping plates are designed to reduce the assembly costs and the number of component parts.

A further object is to provide an improved harvesting head in accordance with the forgoing object and which provides shorter assembly time, less time to repair, and/or a reduction in the weight of the front attachment.

In accordance with the invention there is provided an apparatus for harvesting stalk crops such as corn or the like, including a snapping roller, a conveying device for conveying harvested crop along the snapping roller, a tensioner associated with the conveying device, a guide member formed of synthetic resin and having a guide area for engagement by the conveying device, the guide member having a recess for receiving the conveying device tensioner, a plurality of displaceable snapping gap plates defining a snapping gap area therebetween and located between the snapping roller and the guide member, and means for moving at least one of the snapping gap plates and thereby adjusting the width of the snapping gap.

Advantageously the guide system of the conveyor, the displaceable snapping gap plates, and/or the tensioner are made of an elastic vibration-damping material. In this manner a considerable reduction in weight of the front attachment and a reduction of wear-increasing vibrations is achieved.

In an advantageous manner the guide elements of the conveyor, the guide system of the displaceable snapping gap plate, and the guide system of the tensioner can be integrated in a single guide portion, so that the number of parts to be assembled or to be exchanged in case of damage is considerably reduced.

In an advantageous embodiment of the invention, deflecting elements which are made either partly or completely of elastic vibration-damping material are provided for the means of traction, so that, besides a reduction in weight, a decrease in production costs is achieved.

To reduce the wear-related changing of the snapping rollers, in a further advantageous embodiment according to the invention, it is provided that the end region of the snapping rollers in the direction of travel is made dismountable and, with a view to reducing weight, also made of elastic vibration-damping material.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 4 is a longitudinal section of a guide portion taken generally along line C—C in FIG. 3.

DETAILED DESCRIPTION

Figure 1:
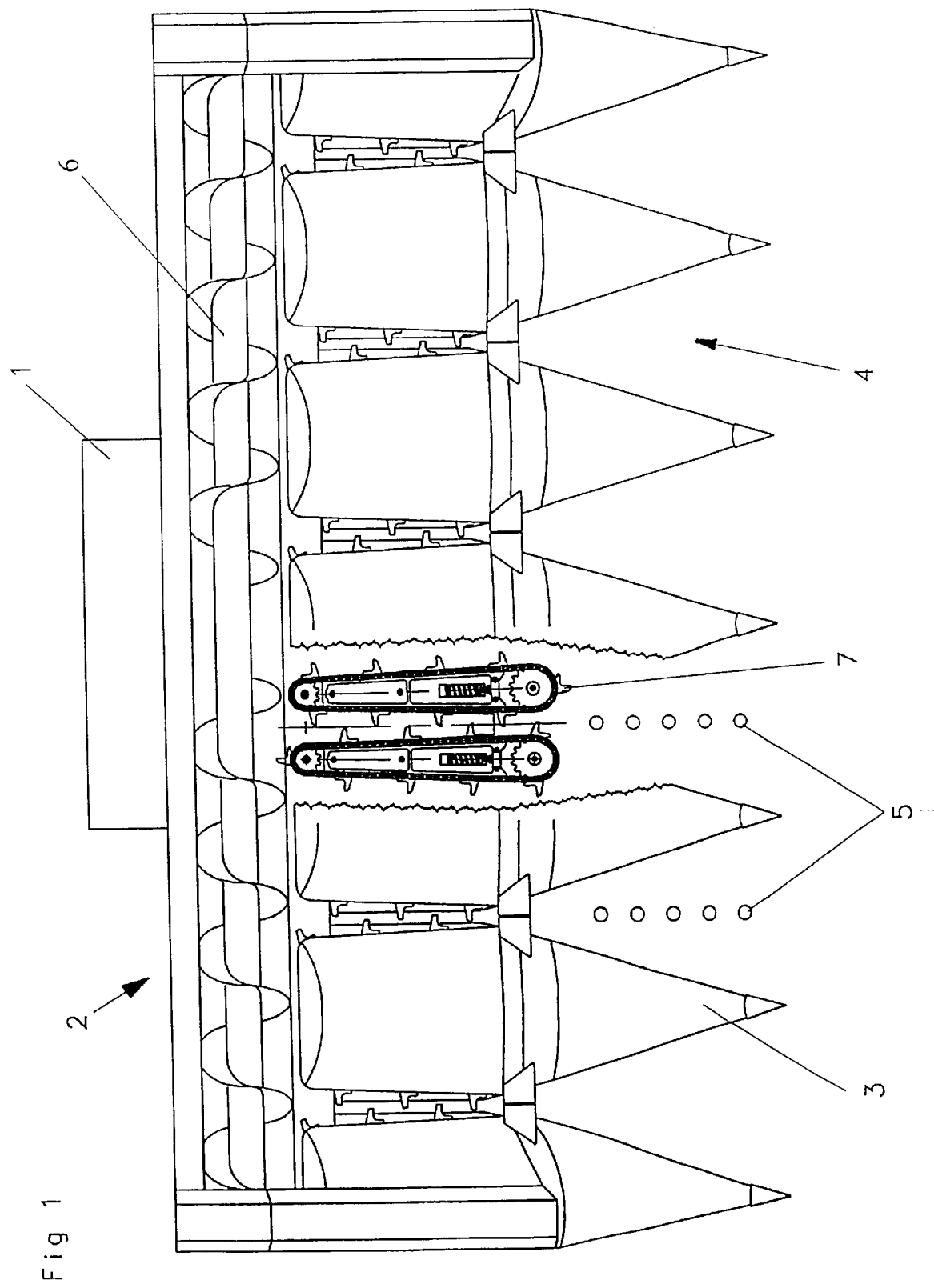
FIG. 1 is a schematic top view of an apparatus for harvesting stalk crops and the like with some members broken away for a better illustration of a snapping unit and conveying device.
Figure 2:
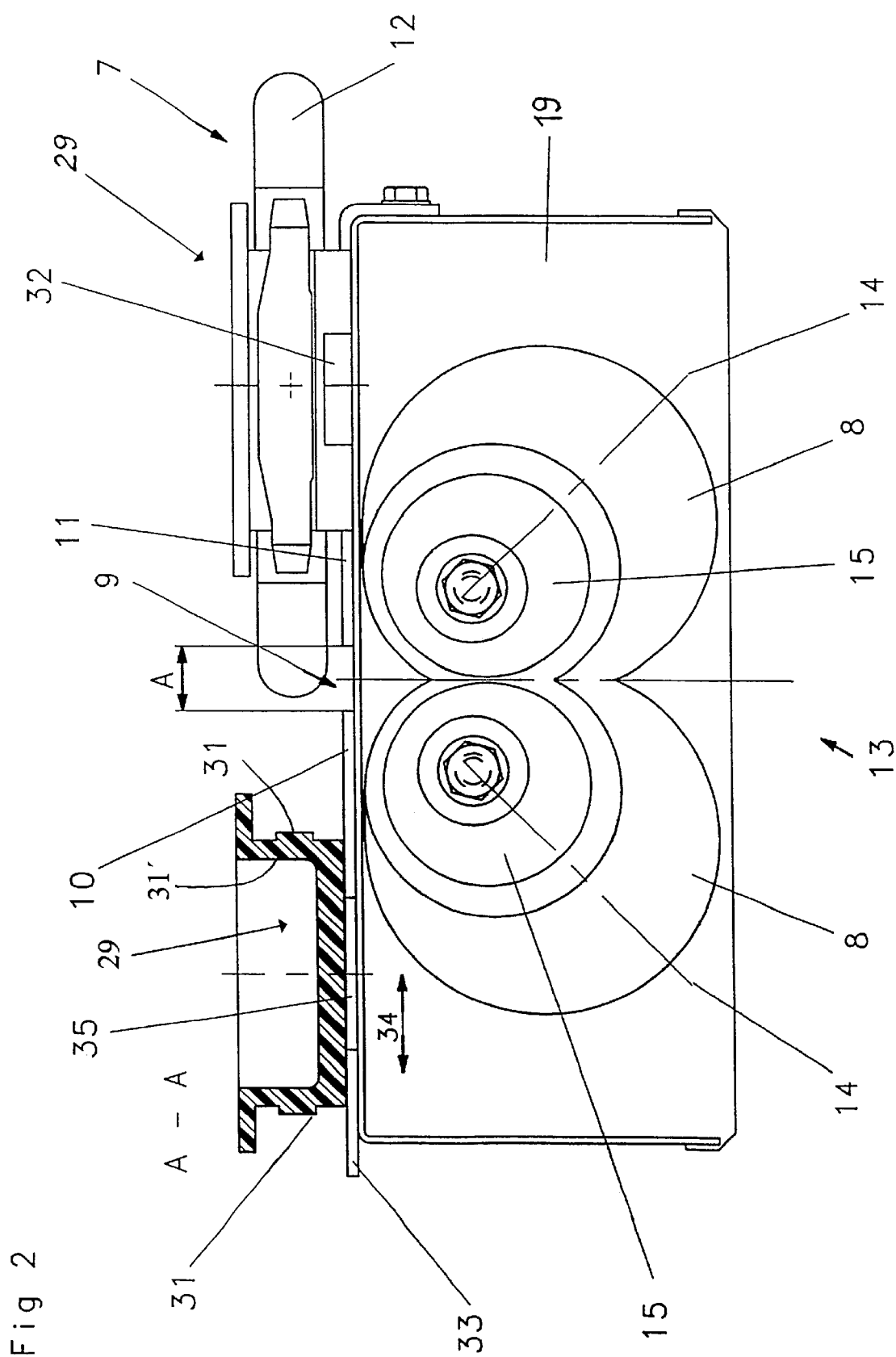
FIG. 2 is a schematic view of a snapping unit and conveying device, in part a front view and in part a cross-section taken along section line A—A in FIG. 3.
Figure 3:
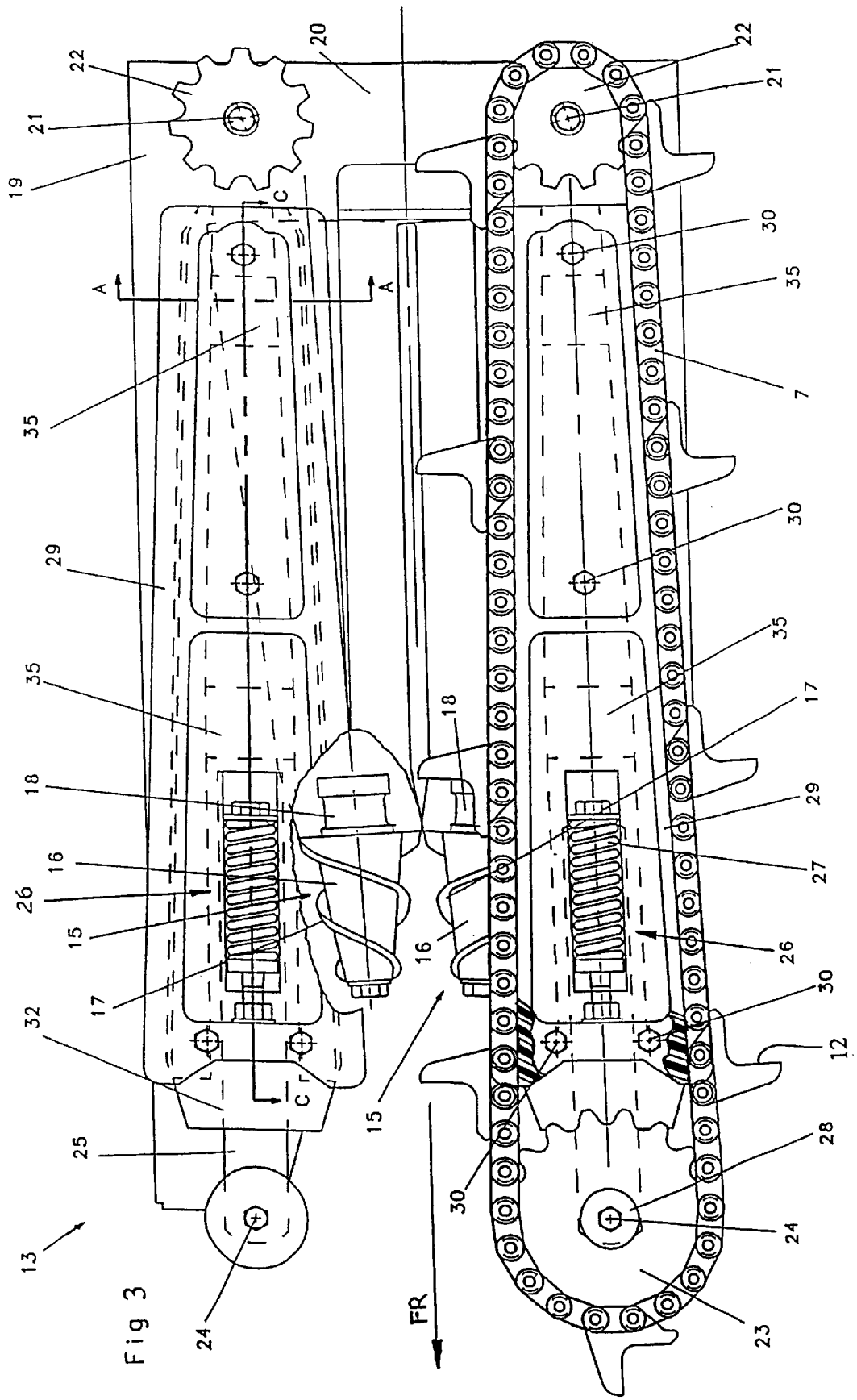
FIG. 3 is a schematic top view of the snapping unit and conveying device with some members broken away for a better illustration of the parts.

FIG. 1 is schematically an apparatus 2 according to the invention for harvesting stalk crops, which is adapted to a carrier machine 1, not shown in more detail, and constructed as a picker and which comprises at least one feed region 4 which is bounded by dividers 3 and tapers in the direction of the carrier machine 1 and through which the crop 5 is fed to the snapping members, which will be described in more detail, and which comprises in its rear region a cross auger 6 which combines centrally in the picker 2 the standing grains, not shown, picked off the stalks 5 and transfers them to transport elements, also not shown, which convey the standing grains in the direction of the carrier machine 1. In the feed region 4 the stalks 5 are collected by conveyor chains 7 and fed to snapping rollers 8 arranged in pairs, which cut off the stalks 5 at a low height above the ground and pull the cut stalk 5 through a snapping gap 9, wherein the standing grains, not shown in more detail, which are on the stalk 5 are stripped on the snapping gap plates 10, 11 and transported by the conveyor elements 12 of the conveyor chains 7 into the rear region of the snapping rollers 8 and there combined centrally by a cross conveying member constructed as a cross auger 6. To promote rotting of the stalks, the snapping rollers 8 can on the lower side be assigned chopping mechanisms, which are known from the state of the art and therefore not shown in more detail and which comminute the stalks 5 conveyed into this region by the snapping rollers 8. The picker 2 according to the invention has a plurality of snapping units 13 arranged adjacent to each other and described in more detail below, of which the outer snapping units 13 can be arranged pivotably on the picker 2 in a manner known in the art to maintain a given transport width. Each snapping unit 13 has a pair of cooperating, at least partially interlocking, counterdriven snapping rollers 8, in which the shafts 14 of the snapping rollers can be arranged converging with or parallel to each other. Each snapping roller 8 has at its front end in the direction of travel FR a dismountable conical tip 15 which according to the invention comprises an envelope 16 made of an elastic vibration-damping material with auger-like product guiding and conveying elements 17 and, for assembly on the shafts 14 of the snapping rollers, a metal core 18. On the carrier machine side the shafts 14 of the snapping rollers lead into a gearbox 20 which is flanged onto the main supporting body 19 of each snapping unit 13 and which on the upper side has emerging shafts 21 which receive drive elements of the conveyor chains 7 constructed as sprockets 22. Through the front sprockets 23 of the counterdriven conveyor chains 7 of each snapping unit 13, pass shafts 24 which are held releasably by a forked holder 25, which at the other end is connected to a chain tensioner 26 known in the art and arranged on the main body 19 and which by means of a compression spring 27 allows a movement of the sprocket 23 in the direction of travel FR or in the opposite direction, so that the wear-related chain stretching can be equalized. The sprockets 22, 23 can according to the invention be made of an elastic vibration-damping material to reduce the weight of the picker 2; this elastic vibration-damping material surrounds directly at least one bearing 28 which supports the sprocket 23 on the shaft 24, or surrounds the shaft 21 which drives the sprocket 22, so that additional bearing bushings known from the state of the art are eliminated. To avoid function-impairing transverse movements of the conveyor chains 7, the conveyor chains 7 are assigned according to the invention on the inside a guide portion 29 made of elastic vibration-damping material and constructed in one piece, which is releasably secured to the main body 19 by means of fasteners 30 passing through holes 30'. Running surfaces 31, in the form of a protuberance on the outside of generally upright wall 31' of the guide portion 29, are arranged to at least partially contact the inside of the conveyor chains 7 extending between the sprockets 22, 23. The preferred material advantageously gives the running surfaces 31 a relatively low coefficient of friction. Each guide portion 29 has, on the side facing toward the sprocket 23, a recess 32 through which passes the holder 25 connected to the chain tensioner 26, so that the recess 32 undertakes guiding the sprocket 23 which is movable by the chain tensioner 26 in the direction of travel FR and in the opposite direction. To adapt the snapping gap 9 to the diameter of the stalks 5, at least one of the snapping plates 10, 11 which form the snapping gap 9 can be displaced transversely to the direction of travel FR, so that the gap size A is adjustable.

Here the snapping plate 10 which is variable in position is connected by an extension 33 to a pivot mechanism which is known from the state of the art and therefore not shown in more detail and by which the snapping plate 10 can be displaced in its position transversely to the direction of travel FR in the arrow direction 34. According to the invention the guide portion 29 has on the lower side, in the region of the extension 33 of the slidable snapping plate 10, a recess 35 which runs transversely to the direction of travel FR and which has the extension 33 of the slidable snapping plate 10 passing through it and so takes over the guiding thereof. Instead of the snapping plate 10 arranged movably in the practical example, it is also possible for only the snapping plate 11 or both snapping plates 10, 11 to be arranged movably, so that either only one guide portion 29 or both guide portions 29 of a snapping unit 13 have a recess 35 on the lower side. In this way the guide portion 29 undertakes, besides guiding the chain 7, guiding the sprocket 23 which is movable in the direction of travel and in the opposite direction, and guiding the displacement mechanism 33 of the slidable snapping plate 10, so that, besides the weight of the guide portion 29 which is lower due to material, a distinct reduction of component parts to be assembled is achieved compared with the state of the art. Manufacture of the guide portion 29, which has a complex shape, can also be greatly simplified by the use of a castable, structural synthetic resin, advantageously an elastic, vibration-damping material having characteristics of toughness and strength. An exemplary example is a polyamide, preferably a polyamide of a non-nylon type. To reduce wear, above all for use of the elastic, vibration-damping material for the sprockets 22, 23, the elastic vibration-damping material can have a hard surface and a soft core. In a further form, not shown, the guide portion 29 can be made up of a plurality of identical components which each comprise only a portion of the guide elements 31. In this manner, in case of damage occurring due to operation, only the component of guide portion 29 which is actually damaged has to be changed. The number of components of guide portions 29 are, in this case, increased. However, such an arrangement makes it possible to replace only one component of guide portion 29. The component, of course, is smaller and less material-intensive and therefore cheaper to change.

The guide portion 29 according to the invention which is described, the sprockets 22, 23 and the dismountable tip 15 of the snapping rollers 8 can also be used on pickers 2 of which the snapping units 13 comprise only one snapping roller and/or only one conveyor chain 7.

I claim:

1. An apparatus for harvesting stalk crops, including a snapping roller, a conveying device for conveying harvested crop along the snapping roller, a conveying device tensioner connected to the conveying device, a guide member formed of elastic vibration-damping material and having a guide area for engagement by the conveying device, the guide member having a recess for receiving the conveying device tensioner, a plurality of displaceable snapping gap plates defining a snapping gap area therebetween and located between the snapping roller and the guide member, and an adjustment mechanism that can variably move at least one of the snapping gap plates and thereby adjust the width of the snapping gap.

2. An apparatus for harvesting stalk crops according to claim 1, wherein the guide member is constructed in one piece and engages the guide elements of the conveying device, wherein the guide system includes at least one displaceable snapping gap plate and has a recess for receiving the conveying device tensioner.

3. An apparatus for harvesting stalk crops according to claim 1, wherein the conveying device includes a deflecting element having a synthetic resin sprocket.

4. An apparatus for harvesting stalk crops according to claim 3, wherein the conveying device includes a synthetic resin deflecting element.

5. An apparatus for harvesting stalk crops according to claim 1, wherein at least one snapping roller includes a dismountable tip limiting the snapping roller in the direction of travel.

6. An apparatus for harvesting stalk crops according to claim 5, wherein the dismountable tip includes an envelope made of synthetic resin with a metal core for attachment to the snapping roller.

7. An apparatus for harvesting stalk crops according to claim 6, wherein the envelope of the dismountable tip includes an auger-like guiding and conveying element.

8. An apparatus for harvesting stalk crops according to claim 1, wherein the elastic vibration-damping material is a structural synthetic resin.

9. An apparatus for harvesting stalk crops according to claim 1, wherein the elastic vibration-damping material has a hard surface and a soft core.

10. An apparatus for harvesting stalk crops according to claim 1, wherein the elastic, vibration-damping material is tough and strong.

11. An apparatus for harvesting stalk crops according to claim 8, wherein the structural synthetic resin is a castable polyamide.

12. An apparatus for harvesting stalk crops according to claim 11, wherein the castable polyamide is a non-nylon type.

13. An apparatus for harvesting stalk crops with at least one conveying device revolving around deflecting elements for conveying the crop along at least one snapping roller having a snapping gap that is variably adjustable using snapping gap plates arranged in guides, a conveying element of the conveying device includes a tensioner located within a guide portion, wherein the snapping gap plates are displaceable and formed of elastic vibration-damping material.

* * * * *